Feb. 20, 1962    P. TAYLOR ETAL    3,021,750
HALF-TONE VISUAL FILM SCANNER
Filed June 16, 1959    2 Sheets-Sheet 1
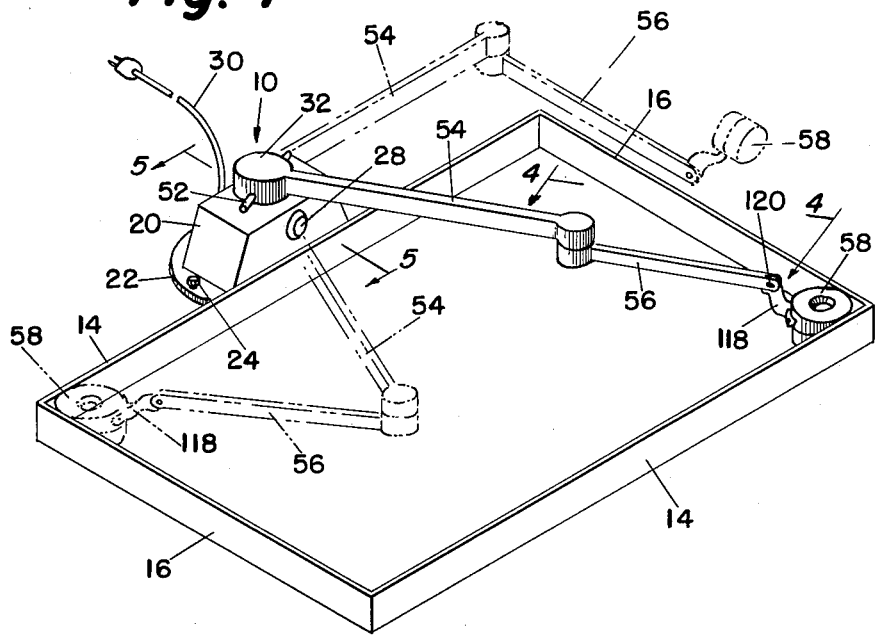
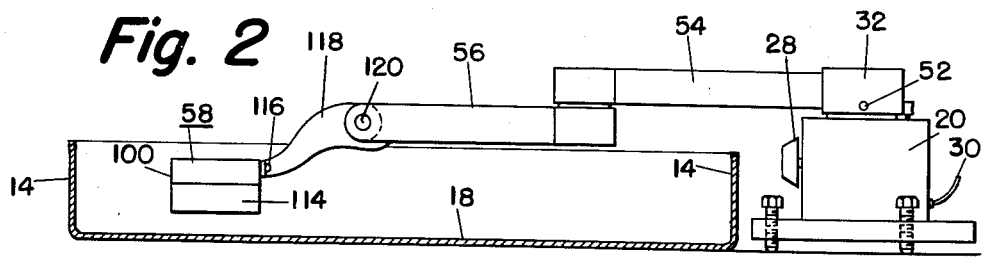
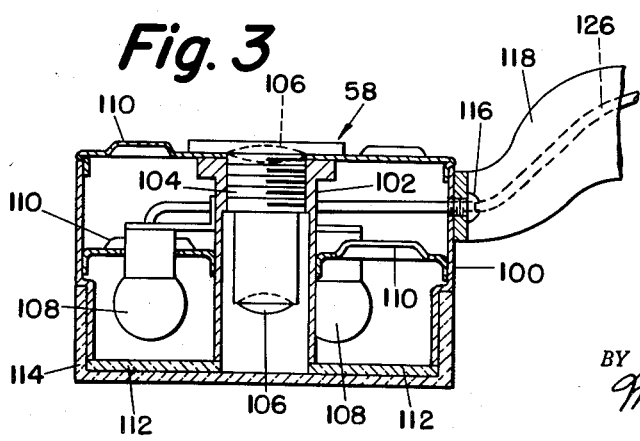
*INVENTORS*
PHILIP TAYLOR
ELWOOD E. BOWERS
BY
*May R. Millman*
ATTORNEY

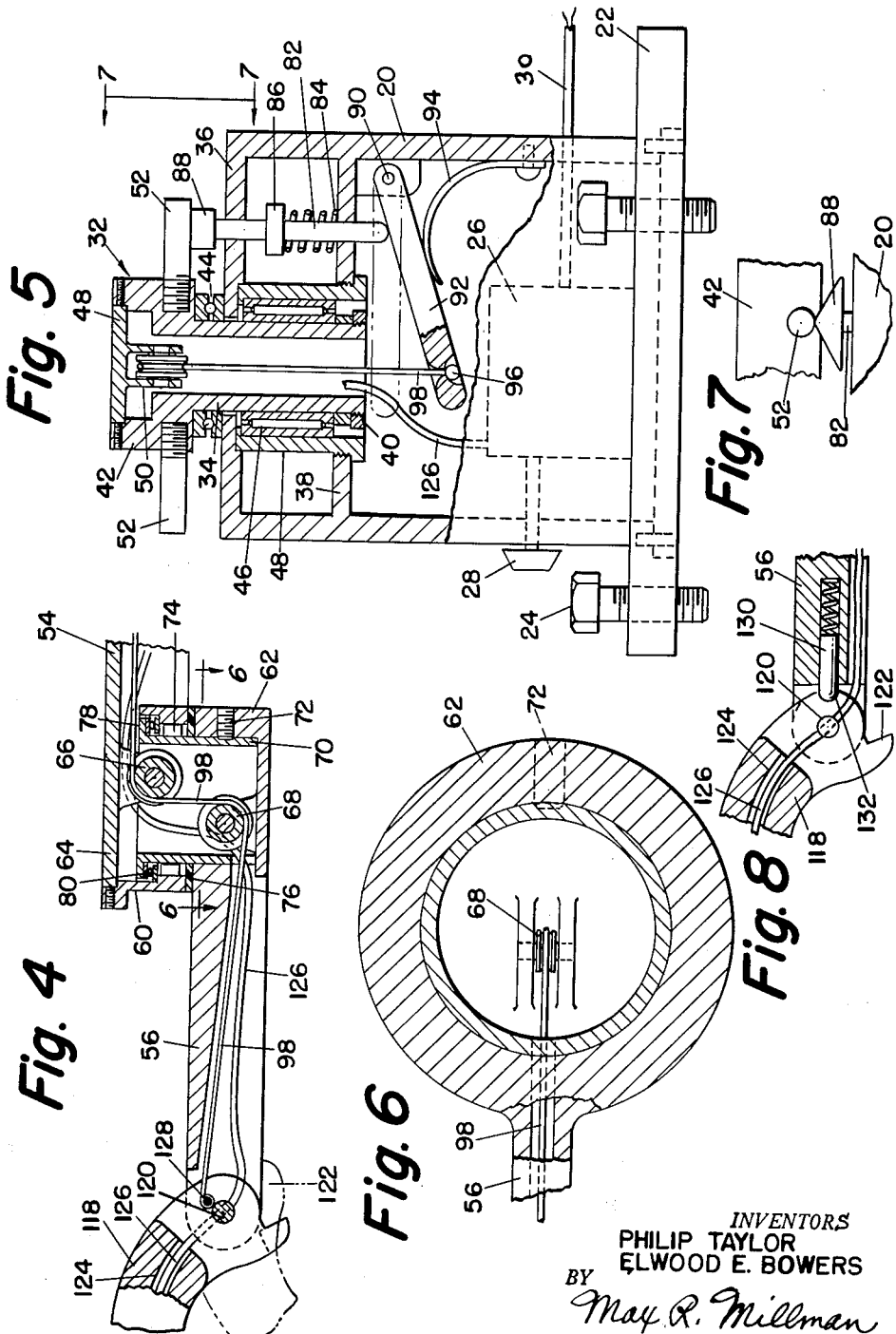

United States Patent Office 3,021,750
Patented Feb. 20, 1962

3,021,750
HALF-TONE VISUAL FILM SCANNER
Philip Taylor, 1903 E. Moyamensing Ave., Philadelphia, Pa., and Elwood E. Bowers, Philadelphia, Pa.; said Bowers assignor to said Taylor
Filed June 16, 1959, Ser. No. 820,787
5 Claims. (Cl. 88—14)

This invention relates to a device for use particularly in photo-lithography, photo-engraving and like processes.

It is well known in photo-lithographing that the relative dot size is the determining factor in the development of half-tone film negatives or positives. Consequently, the practice today is to remove the film material from the developer and view the same via transmitted light under magnification while the film material is held in a vertical position. Because the oxidative rate of the developer (generally paraformaldehyde) is very high, the heat of the hand in holding the film and the unevenness of flow of the developer down the film causes mottling and streaking in the film, frequently rendering the film unusable thereafter.

The primary object of the invention is to provide a device which overcomes the disadvantages noted above. By enabling the film to remain in the developer and to be viewed by reflected light in a horizontal position, the device affords an economical and easily operated means for scanning the film under magnification without fear that mottling and streaking will occur during inspection. The device will therefore also enable the operator to make a thorough rather than rapid and perfunctory examination of the film while easing the tension of the operator during such inspection.

Another object of the invention is to provide a visual half-tone scanner which is provided with a shielded safelight magnifier and means to move the same in all directions over the developing bath.

Another object of the invention is to provide a visual half-tone film scanner in the form of a compact device which can be placed beside an existing developing tray, the same including a safelight magnifying viewer mounted upon pivotally interconnected arms enabling the viewer to be moved over all portions of the film in the developing bath with ease of manipulation.

Another object of the invention is to provide a film scanner as above described wherein the viewer may be moved, either manually or automatically from a viewing position downward in the developing tray to a non-viewing position above the upper edges thereof.

Another object of the invention is to provide a viewer including a magnifier, an illumination element, a safelight filter and a transparent shield permitting insertion of the viewer into the developing bath when scanning the film therein.

These and other objects of the invention will become more apparent as the following description proceeds in conjunction with the accompanying drawings, wherein:

FIGURE 1 is a perspective view of the scanner;
FIGURE 2 is a side elevational view thereof;
FIGURE 3 is a vertical sectional view through the magnifying viewer;
FIGURE 4 is an enlarged sectional view taken on the line 4—4 of FIGURE 1;
FIGURE 5 is an enlarged sectional view taken on the line 5—5 of FIGURE 1;
FIGURE 6 is an enlarged sectional view taken on the line 6—6 of FIGURE 4;
FIGURE 7 is a view of a detail of the invention as seen from line 7—7 of FIGURE 5; and
FIGURE 8 is a fragmentary longitudinal sectional view through a portion of the magnifying viewer and attached arm and illustrating a modified form of the invention.

Specific reference is now made to the drawings wherein similar reference characters are used for corresponding elements throughout.

The device which is generally indicated at 10 is adapted to be positioned adjacent a conventional developing tray 12 having side and end walls 14 and 16 and a bottom wall 18. It is preferable that the device be placed midway along the length of one of the side walls 14 as shown in FIGURE 1. It includes a casing 20 mounted on a base plate 22 equipped with a plurality of leveling screws 24, there being a variable transformer 26 in the casing with an operating handle 28 therefor and conductive wires 30 adapted for operative connection to an electrical source.

A member 32 is provided which is mounted on the casing 20 for rotation about a vertical axis, said member including a tubular member 34 extending rotatably through an aperture in the upper wall 36 of the casing and through an aperture in a wall 38 therebelow. Threaded or otherwise secured to the lower end of the tubular member 34 is a retaining ring 40, the upper end of the member 34 terminating in an enlarged hollow head 42, there being a thrust retaining ring 44 between said head and the upper wall of the casing 20. The member 34 is rotatable in suitable roller bearings 46 retained in a roller shaft 48 which is secured to the upper wall 36 and further wall 38 of the casing 20. The head 32 is provided with a closure member 48 from which depends a sheave 50 centered axially with respect to the bore of the tubular member 34. The head 42 is provided with one and preferably two laterally extending bars 52 spaced 180° apart.

Integral with or otherwise secured to the member 42 is a hollow upper arm 54 which is spaced vertically above and pivoted at its inner end for movement about a vertical axis to the inner end of a lower hollow arm 56, the outer end of said arm 56 being operatively connected to a magnifying safelight viewer 58. The pivotal connection of the inner ends of said arms 54 and 56 can be effected in various ways, one of which is shown in the drawings. The upper arm 54 is connected to a housing 60 and the lower arm 56 to a housing 62. Depending from a closure member 64 of the upper housing is a sheave 66 which is longitudinally offset from a sheave 68 that is carried by the housing 62. A roller shaft 70 is provided which is secured as at 72 to the lower housing 62, the shaft being disposed in the respective upper and lower housings. Suitable rollers 74 are retained between the roller shaft and the inner wall of the upper housing 60, there being a thrust washer 76 between the upper and lower housings. The upper end of the roller shaft 70 includes a flange 78 and between said flange and an annular shoulder in the upper housing 60 is retained suitable thrust bearings and washers 80.

Returning momentarily to the transformer casing 20, it will be seen from FIGURES 5 and 6 that a rod 82 is provided which is vertically slidable through the upper wall 36 and further wall 38 therebelow, there being a spring 84 between the wall 38 and an abutment 86 on the rod urging the latter upwardly. The upper end of the rod includes a suitable cam surface 88. Pivoted as at 90 to the casing 20 at the interior thereof for vertical movement below said rod 82 is a lever 92 urged towards the lower end of said rod 82 by a suitable spring 94. Secured to the free end of the lever 92 as at 96 is a cable 98 which extends through the tubular member 34, over the sheave 50, through the upper arm 54, over the sheaves 66 and 68 and through the lower arm 56, and is operatively connected to the viewer in a manner and for a purpose soon to be described.

The viewer 58 itself comprises a casing 100, preferably cylindrical, with an axial tubular portion 102 which threadedly receives a housing 104 that mounts spaced magnifying lenses 106. The entire housing may be replaced to change magnification. Appropriately mounted in the casing about the tubular portion 102 thereof are illumination elements, such as bulbs 108, there being vents or louvres 110 in the upper wall of the casing and in a baffle intermediate the ends of the casing. Appropriately cemented to the lower end of the casing beneath the illumination elements is a red filter 112 which is photographically safe for orthochromatic sensitive material. Cemented to the casing and shielding the entire lower end thereof is a transparent member 114, preferably glass, so that the viewer can be inserted in a developing bath with no damage to the illumination elements and lenses.

Appropriately secured as at 116 to the upper portion of the casing 100 is a short upwardly extending arm 118 which at its free end is slotted to receive the outer end of the lower arm 56 to which it is pivoted about a horizontal pin 120. The free end of the arm 118 includes a cut-out portion 122 adapted to abut a portion of the lower arm 56 and limit the downward position of the viewer.

The viewer arm 118 also includes a longitudinal bore 124 through which extends conductive wires 126. The wires 126 are operatively connected to the illumination elements 108 and to the variable transformer 26, the wires passing diametrically through the pivot pin 120 and loosely through the upper and lower arms 54 and 56 and the member 32. The previously described cable 98 is secured at its free end to a pin 128 carried by the viewer arm as seen in FIGURE 4.

In use, with the film in the developing bath in the tray, the viewer 58 is manually moved, as shown in FIGURE 1, to scan all portions of the film. The light from the illumination elements 108 is reflected from the black exposed converted metallic silver and the white unexposed silver salts on the film and is viewed through the magnifying lens housing 104 whose focus may readily be adjusted by rotation. Because of the transparent shield 114, the viewer can be inserted in the developing bath.

After scanning, the operator may remove the viewer from the tray by moving it to a predetermined position, such as when the upper and lower arms 54 and 56 are substantially parallel to the side and end walls 14 and 16 of the tray, as shown in dotted lines in FIGURE 1. In this position one or the other of the rods 52 associated with rotatable member 32 strikes the cam surface 88 of rod 82 until it reaches the crest thereof, whereupon rod 82 is depressed against action of its spring 84. Rod 82 then depresses lever 92 against action of its spring 94 thereby exerting tension or a pull on cable 98 lifting arm 118 and viewer 58 to an upward non-viewing position above and in position to clear the walls of the tray.

The viewer 58 may also be moved manually to an upward tray-clearing position in which case the actuating pin or rod 82, lever 92, cable 98 and sheaves 50, 66 and 68 are not required. Instead, the outer end of the lower arm 56 is provided with a spring-urged detent 130 which is adapted to releasably hold the arm 118 and viewer 58 in the upward position by engaging a notch 132 in a predetermined portion of the free end of the arm 118 as shown in FIGURE 8.

While preferred embodiments of the invention have here been shown and described, it is to be understood that skilled artisans may make minor variations without departing from the spirit of the invention and the scope of the appended claims.

We claim:
1. For use in scanning film during processing of halftone negatives or positives and the like, a viewing device comprising a casing, a lens tube mounted in said casing having an upper viewing end and a lower light-receiving end, illumination means mounted in said casing externally of said lens tube, a safelight filter mounted beneath said illumination means and a liquid-tight shield sealingly secured to said casing including a transparent portion covering said filter and the light-receiving end of said lens tube whereby said viewer can be inserted into a processing bath without damaging the elements in the casing.

2. The combination of claim 1 wherein said lens tube is mounted centrally in said casing and said illumination means comprises at least two illumination elements mounted circumferentially about said lens tube.

3. The combination of claim 1 wherein said lens tube is threadedly mounted in said casing to permit adjustable focusing.

4. The combination of claim 1 and an arm carried by said casing and extending laterally therefrom and conductive wires operatively connected to said illumination means and extending through said arm for connection to an electric source.

5. For use in scanning film during processing of halftone negatives or positives and the like in a tray, a viewing device comprising a casing, a lens tube mounted in said casing having an upper viewing end and a lower light-receiving end illumination means mounted in said casing externally of said lens tube, a safelight filter mounted beneath said illumination means and a liquid-tight shield sealingly secured to said casing including a transparent portion covering said filter and the light-receiving end of said lens tube whereby said viewer can be inserted into a processing bath without damaging the elements in the casing and articulated arms operatively connected to said viewer to extend said viewer to any position in the tray.

References Cited in the file of this patent

UNITED STATES PATENTS

| | | |
|---|---|---|
| 1,305,032 | Trent | May 27, 1919 |
| 1,814,540 | Bander | July 14, 1931 |
| 2,377,056 | Tontrup | May 29, 1945 |
| 2,540,953 | Kessler | Feb. 6, 1951 |
| 2,599,269 | Markle | June 3, 1952 |
| 2,730,921 | Little | Jan. 17, 1956 |

FOREIGN PATENTS

| | | |
|---|---|---|
| 29,500 | Germany | Nov. 28, 1884 |